United States Patent
Lee et al.

(10) Patent No.: US 10,542,470 B2
(45) Date of Patent: Jan. 21, 2020

(54) METHOD AND DEVICE FOR ADJUSTING RANDOM ACCESS BACKOFF PARAMETER

(71) Applicant: LG Electronics Inc., Seoul (KR)

(72) Inventors: Youngdae Lee, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/307,405

(22) PCT Filed: Mar. 19, 2018

(86) PCT No.: PCT/KR2018/003177
§ 371 (c)(1),
(2) Date: Dec. 5, 2018

(87) PCT Pub. No.: WO2018/174496
PCT Pub. Date: Sep. 27, 2018

(65) Prior Publication Data
US 2019/0098540 A1    Mar. 28, 2019

Related U.S. Application Data

(60) Provisional application No. 62/475,165, filed on Mar. 22, 2017, provisional application No. 62/475,161, filed on Mar. 22, 2017.

(51) Int. Cl.
*H04W 36/00* (2009.01)
*H04W 36/08* (2009.01)
(Continued)

(52) U.S. Cl.
CPC ....... *H04W 36/0077* (2013.01); *H04W 24/10* (2013.01); *H04W 36/0085* (2018.08);
(Continued)

(58) Field of Classification Search
None
See application file for complete search history.

(56) References Cited

U.S. PATENT DOCUMENTS 9,408,236 B2 * 8/2016 Cho ............... H04W 74/0833
2006/0268768 A1 * 11/2006 Harris ............... H04W 48/12
370/328

(Continued)

FOREIGN PATENT DOCUMENTS

JP    2012-094976    5/2012
KR    10-2000-0029041    5/2000
(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 14)," 3GPP TS 36.321, V14.1.0, Dec. 2016, 100 pages.

*Primary Examiner* — Michael J Moore, Jr.
(74) *Attorney, Agent, or Firm* — Fish & Richardson P.C.

(57) ABSTRACT

Provided are a method for a terminal adjusting a random access backoff parameter in a wireless communication system, and a device supporting same. The method may comprise the steps of: receiving priority information; initiating a random access procedure while executing a handover; receiving, from a base station, a random access response including a backoff indicator; and on the basis of the priority information, adjusting a random access backoff parameter indicated by the backoff indicator.

18 Claims, 12 Drawing Sheets

(51) Int. Cl.
*H04W 76/11* (2018.01)
*H04W 24/10* (2009.01)
*H04W 76/27* (2018.01)
H04W 74/08 (2009.01)
H04W 80/02 (2009.01)

(52) U.S. Cl.
CPC ............ *H04W 36/08* (2013.01); *H04W 76/11* (2018.02); *H04W 76/27* (2018.02); *H04W 74/085* (2013.01); *H04W 74/0875* (2013.01); *H04W 80/02* (2013.01)

(56) References Cited

U.S. PATENT DOCUMENTS

| | | | | |
|---|---|---|---|---|
| 2011/0274040 | A1* | 11/2011 | Pani | H04W 4/70 |
| | | | | 370/328 |
| 2012/0275429 | A1* | 11/2012 | Chin | H04W 74/085 |
| | | | | 370/331 |
| 2013/0250925 | A1* | 9/2013 | Lohr | H04W 72/0446 |
| | | | | 370/336 |
| 2014/0119201 | A1* | 5/2014 | Kim | H04W 74/0833 |
| | | | | 370/242 |
| 2015/0282214 | A1* | 10/2015 | Lee | H04W 74/085 |
| | | | | 370/329 |
| 2017/0099671 | A1* | 4/2017 | Li | H04W 72/087 |
| 2017/0367120 | A1* | 12/2017 | Murray | H04B 7/0695 |

FOREIGN PATENT DOCUMENTS

| | | | | |
|---|---|---|---|---|
| KR | 20130009959 A | * | 1/2013 | ............. H04W 4/70 |
| KR | 20130124198 A | * | 11/2013 | ............ H04W 74/08 |
| WO | 2011/136558 | | 11/2011 | |

\* cited by examiner

METHOD AND DEVICE FOR ADJUSTING RANDOM ACCESS BACKOFF PARAMETER

CROSS-REFERENCE TO RELATED APPLICATIONS

This application is a National Stage application under 35 U.S.C. § 371 of International Application No. PCT/KR2018/003177, filed on Mar. 19, 2018, which claims the benefit of U.S. Provisional Application No. 62/475,165, filed on Mar. 22, 2017, and U.S. Provisional Application No. 62/475,161, filed on Mar. 22, 2017. The disclosures of the prior applications are incorporated by reference in their entirety.

BACKGROUND OF THE INVENTION

Field of the Invention

The present invention relates to a wireless communication system, and more particularly, to a method in which a user equipment (UE) adjusts a random access backoff parameter, and an apparatus supporting the method.

Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

SUMMARY OF THE INVENTION

Meanwhile, the conventional backoff mechanism may be applied to all cases whenever a user equipment (UE) performs random access. Accordingly, prioritized accesses may be delayed together with non-prioritized accesses because a base station cannot identify priorities of random access transmissions. For example, when the UE performs a handover, the UE may transmit a measurement report or a handover complete message via a contention-based random access procedure. However, in a congestion state, the measurement report or the handover complete message may be delayed due to backoff. Therefore, there is a need to propose a method in which the UE adjusts a random access backoff parameter, and an apparatus supporting the method.

According to an embodiment, there is provided a method in which a user equipment (UE) adjusts a random access backoff parameter in a wireless communication system. The method may include: receiving priority information; initiating a random access procedure while performing a handover; receiving a random access response including a backoff indicator from a base station; and adjusting the random access backoff parameter indicated by the backoff indicator based on the priority information.

According to another embodiment, there is provided a UE for adjusting a random access backoff parameter in a wireless communication system. The UE may include: a memory; a transceiver; and a processor for operatively coupling the memory and the transceiver. The processor may be configured to: control the transceiver to receive priority information; initiate a random access procedure while performing a handover; control the transceiver to receive a random access response including a backoff indicator from a base station; and adjust the random access backoff parameter indicated by the backoff indicator based on the priority information.

A user equipment (UE) can adjust a random access backoff parameter.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A/5G. However, technical features of the present invention are not limited thereto.

Figure 1:
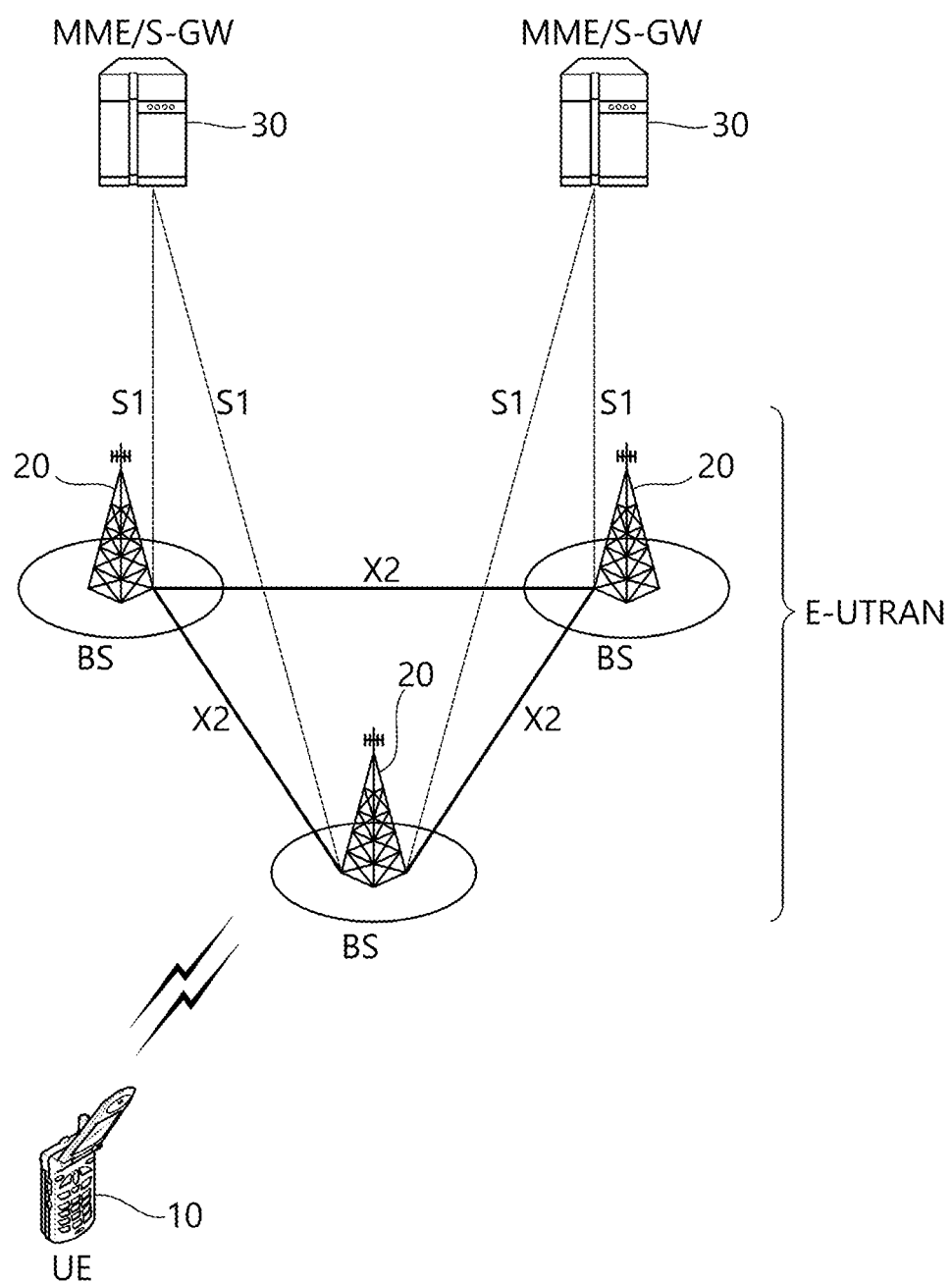
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The 5-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
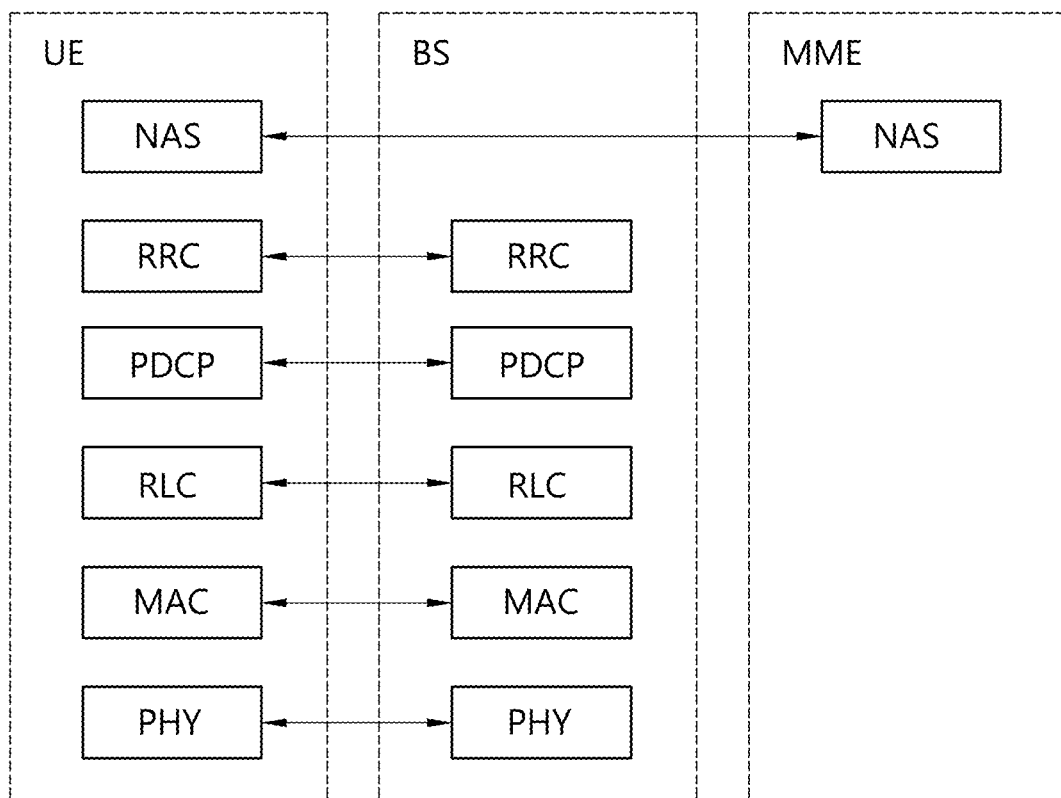
FIG. 2 shows a control plane of a radio interface protocol of an LTE system.
Figure 3:
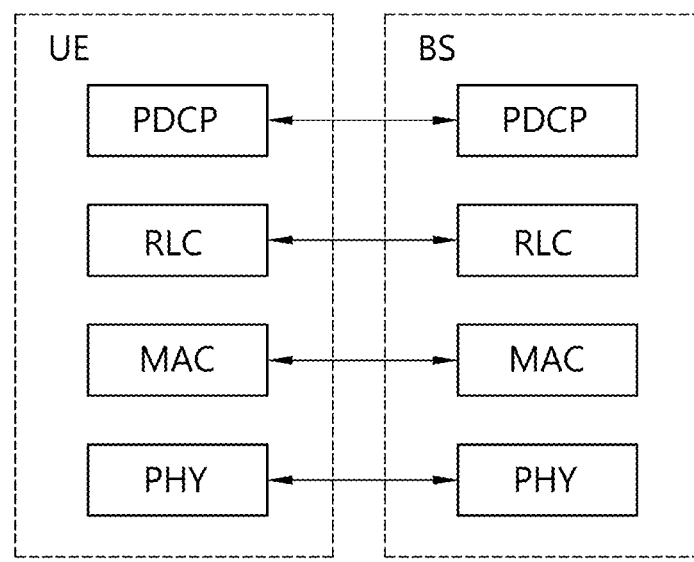
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARM). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, a 5G network structure is described.

Figure 4:
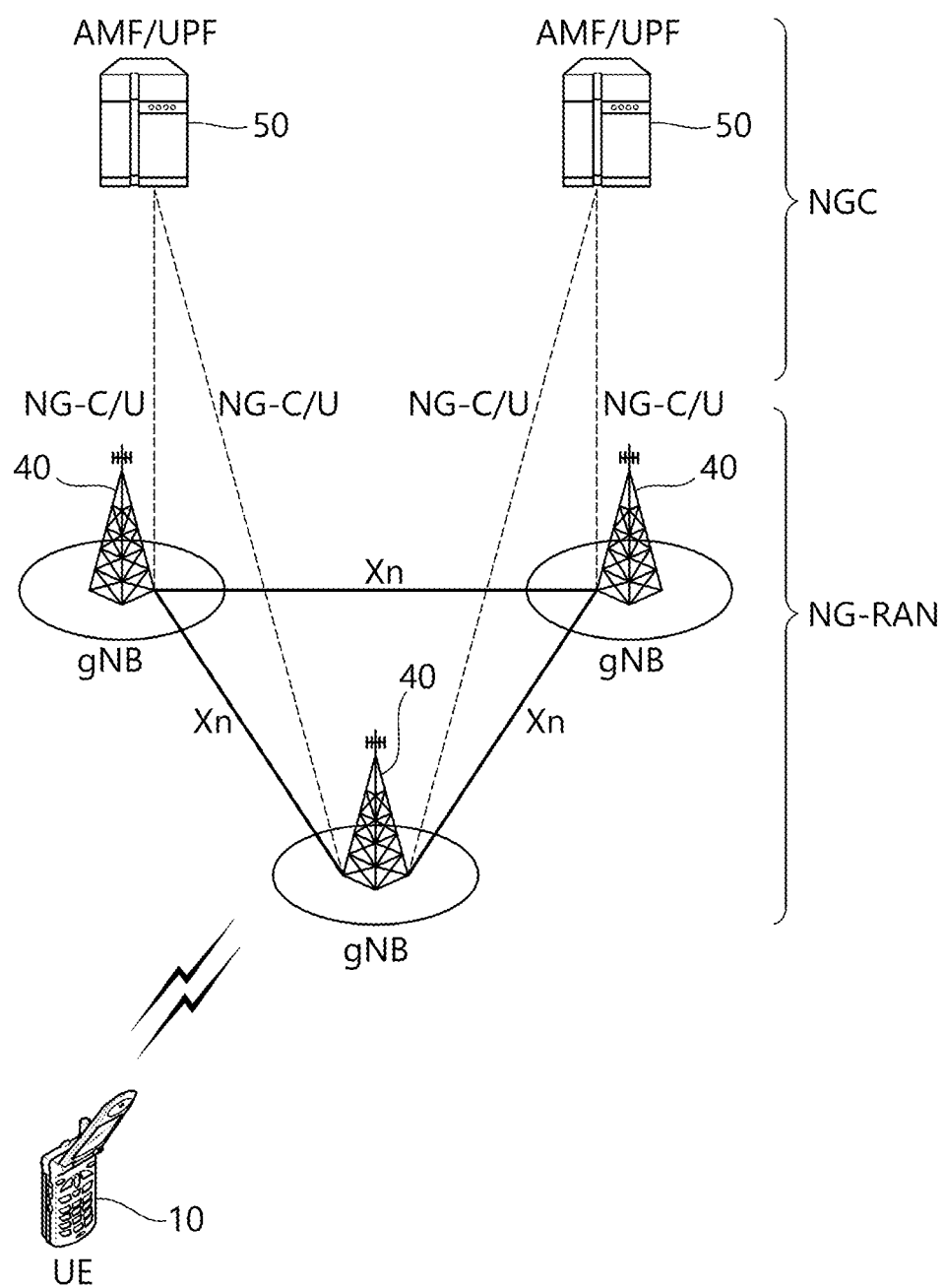
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Figure 5:
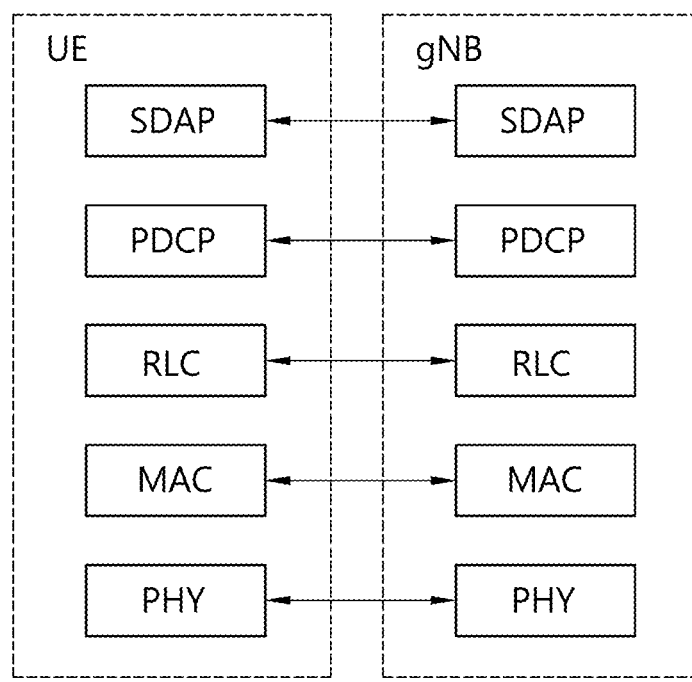
FIG. 5 shows a wireless interface protocol of a 5G system for a user plane.

FIG. 5 shows a wireless interface protocol of a 5G system for a user plane.

Referring to FIG. 5, the wireless interface protocol of the 5G system for the user plane may include a new layer called a service data adaptation protocol (SDAP) in comparison with an LTE system. A primary service and function of the SDAP layer includes mapping between quality of service (QoS) flow and a data radio bearer (DRB) and QoS flow ID (QFI) marking in both DL and UL packets. A single protocol entity of the SDAP may be configured for each individual PDU session, except for dual connectivity (DC) for which two entities can be configured.

Hereinafter, random access will be described.

Random access is used by a UE to obtain uplink synchronization with a BS or to be allocated an uplink radio resource. After power is turned on, a UE obtains downlink synchronization with an initial cell and receives system information. Then, the UE acquires, from the system information, a set of available random access preambles and information about a radio resource used for transmission of a random access preamble. The radio resource used for transmission of the random access preamble may be specified as a radio frame and/or a combination of at least one or more subframes. The UE transmits a random access preamble randomly selected from the set of random access preambles, and the BS having received the random access preamble sends a timing alignment (TA) value for uplink synchronization to the UE through a random access response. Thus, the UE obtains uplink synchronization.

That is, the BS allocates a dedicated random access preamble to a specific UE, and the UE performs non-contention random access using the random access preamble. That is, there may be in a process of selecting a random access preamble, contention-based random access in which a UE randomly selects and uses one random access preamble from a particular set and non-contention random access in which only a specific UE is allocated a random access preamble by a BS. Non-contention random access may be used for a handover procedure or upon a request by a BS's command.

Figure 6:
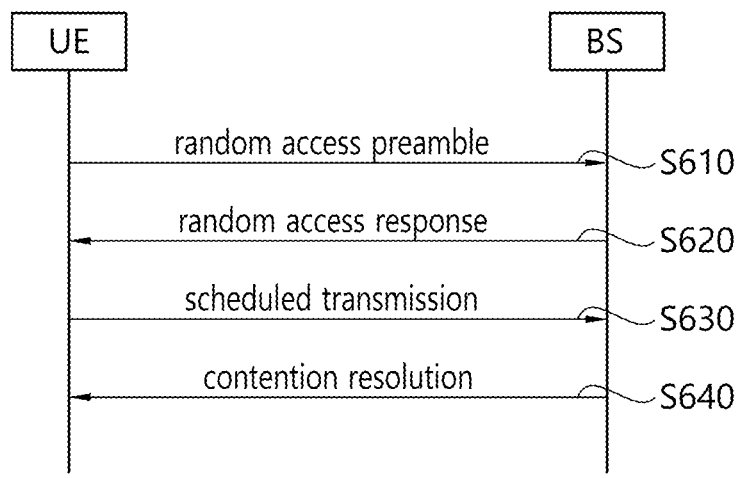
FIG. 6 shows a contention-based random access procedure.

FIG. 6 shows a contention-based random access procedure.

Referring to FIG. 6, a UE randomly selects one random access preamble from a random access preamble set indicated by system information or a handover command. The UE selects a radio resource for transmitting the random access preamble to transmit the selected random access preamble (S610). The radio resource may be a specific subframe, and selecting the radio resource may be selecting a physical random access channel (PRACH).

After transmitting the random access preamble, the UE attempts to receive a random access response within a random access response reception window indicated by the system information or the handover command and accordingly receives a random access response (S620). The random access response may be transmitted in an MAC PDU format, and the MAC PDU may be forwarded via a physical downlink shared channel (PDSCH). Further, a physical downlink control channel (PDCCH) is also forwarded so that the UE properly receives information forwarded via the PDSCH. That is, the PDCCH includes information on the UE receiving the PDSCH, frequency and time information on a radio resource for the PDSCH, and a transmission format for the PDSCH. Once successfully receiving the PDCCH forwarded to the UE, the UE properly receives the random access response transmitted via the PDSCH based on the information in the PDCCH.

The random access response may include a random access preamble identifier (ID), an uplink radio resource (UL grant), a temporary cell-radio network temporary identifier (C-RNTI), and a time alignment command (TAC). Since one random access response may include random access response information for one or more UEs, a random access preamble ID may be included to indicate a UE for which a UL grant, a temporary C-RNTI, and a TAC are valid. The random access preamble ID may be an ID of the random access preamble received by a BS. The TAC may be included as information for the UE to adjust uplink synchronization. The random access response may be indicated by a random access ID on the PDCCH, that is, a random access-radio network temporary identifier (RA-RNTI).

When the UE receives the random access response valid therefor, the UE processes information included in the random access response and performs scheduled transmission to the BS (S630). That is, the UE applies the TAC and stores the temporary C-RNTI. Further, the UE transmits data stored in a buffer of the UE or newly generated data to the BS using the UL grant. In this case, information to identify the UE needs to be included, which is for identifying the UE in order to avoid a collision since the BS does not determine which UEs perform random access in a contention-based random access process.

There are two methods for including information for identifying a UE. When the UE has a valid cell ID already allocated by a corresponding cell before performing random access, the UE transmits the cell ID thereof through the UL grant. However, when the UE is not allocated a valid cell ID before the random access process, the UE transmits a unique ID thereof (e.g., S-TMSI or random ID). Generally, the unique ID is longer than the cell ID. When the UE transmits the data via the UL grant, the UE starts a contention resolution timer.

After transmitting the data including the ID of the UE through the UL grant allocated by receiving the random access response, the UE waits for an instruction from the BS to avoid a collision (S640). That is, the UE attempts to receive the PDCCH in order to receive a specific message. There are two proposed methods for receiving a PDCCH. As described above, when the ID of the UE transmitted via the UL grant is a cell ID, the UE may attempt to receive the PDCCH using the cell ID of the UE. In this case, when the UE receives the PDCCH through the cell ID of the UE before the contention resolution timer expires, the UE determines that random access has been normally performed and terminates random access. When the ID transmitted via the UL grant is the unique ID, the UE may attempt to receive the PDCCH using the temporary C-RNTI included in the random access response. In this case, when the UE receives the PDCCH through the temporary cell ID before the contention resolution timer expires, the UE identifies data forwarded by the PDSCH indicated by the PDCCH. When the data includes the unique ID of the UE, the UE may determine that random access has been normally performed and may terminate random access.

Figure 7:
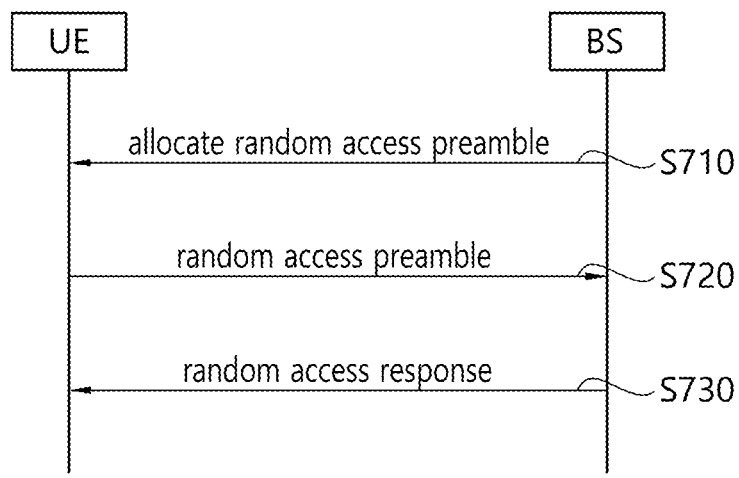
FIG. 7 shows a non-contention random access procedure.

FIG. 7 shows a non-contention random access procedure.

Unlike contention-based random access, non-contention random access may be terminated when a UE receives a random access response.

Non-contention random access may be initiated by a request, such as a handover and/or a command from a BS. Here, in these two cases, contention-based random access may also be performed.

The UE is allocated by the BS a designated random access preamble having no possibility of a collision. The random access preamble may be allocated through a handover command and a PDCCH command (S710).

After being allocated the random access preamble designated for the UE, the UE transmits the random access preamble to the BS (S720).

Upon receiving the random access preamble, the BS transmits a random access response to the UE in response (S730). A procedure associated with the random access response has been mentioned above in S620 of FIG. 6.

Hereinafter, random access backoff will be described.

If a random access response includes a backoff indicator subheader, a backoff parameter value of a UE may be set as indicated by a BI field of the backoff indicator subheader. Table 1 below shows the backoff parameter value. Otherwise, the backoff parameter value of the UE may be set to 0 ms.

TABLE 1

| Index | Backoff parameter value (ms) |
|---|---|
| 0 | 0 |
| 1 | 10 |
| 2 | 20 |
| 3 | 30 |
| 4 | 40 |
| 5 | 60 |

TABLE 1-continued

| Index | Backoff parameter value (ms) |
|---|---|
| 6 | 80 |
| 7 | 120 |
| 8 | 160 |
| 9 | 240 |
| 10 | 320 |
| 11 | 480 |
| 12 | 960 |
| 13 | Reserved |
| 14 | Reserved |
| 15 | Reserved |

If the random access preamble is selected by MAC based on the backoff parameter of the UE in the random access procedure, a random backoff time may be selected according to a uniform distribution between 0 and the backoff parameter value. Therefore, a subsequent random access transmission may be delayed by the backoff time.

Meanwhile, when a UE performs a random access procedure, if the UE receives a backoff indicator (BI) from any random access response message, the UE may store the BI. If the random access response message is not received, the UE may apply backoff. Alternatively, if a contention resolution is not solved, the UE may apply the backoff. The conventional backoff mechanism may be applied to all cases whenever the UE performs random access. Thus, in a congestion situation, all random access attempts may be delayed due to the backoff. That is, prioritized accesses may be delayed together with non-prioritized accesses because a BS cannot identify priorities of random access transmissions. For example, when the UE performs a handover, the UE may transmit a measurement report or a handover complete message via a contention-based random access procedure. However, in a congestion state, the measurement report or the handover complete message may be delayed due to backoff. This may delay the handover or SCell addition, which may result in a call drop or performance deterioration.

Meanwhile, when the RRC connection establishment procedure is initiated, a UE RRC may perform an access barring mechanism. For example, the access barring mechanism may be at least any one of ACB (Access Class Barring), ACB skip, EAB (Extended Access Barring), and ACDC (Application specific Congestion control for Data Communication). If the UE RRC passes an access barring check, the UE RRC may instruct a UE L2 to transmit an RRC connection request message. Then, the UE MAC may initiate the random access procedure to transmit the RRC message. When the UE performs the random access procedure, if the UE receives a backoff indicator (BI) from any random access response message, the UE may store the BI. If the random access response message is not received, the UE may apply backoff. Alternatively, if a contention resolution is not solved, the UE may apply the backoff. The conventional backoff mechanism may be applied to all cases whenever the UE performs the random access. Accordingly, the UE shall perform both the access barring mechanism and the random access backoff for some state transitions. Thus, even though a certain connection request has been prioritized in the access barring mechanism, the connection request may be still delayed and de-prioritized due to random access backoff.

Accordingly, there is a need to propose a method of adjusting a random access backoff parameter, and an apparatus supporting the method. Hereinafter, the method of adjusting the random access backoff parameter will be described according to an embodiment of the present invention.

A BS may signal priority information to a UE. The priority information may be information for adjusting a random access backoff parameter. The priority information may include at least any one of a threshold value of a priority, a list of priorities, and a list of access categories. The priority may correspond to at least any one of a logical channel priority, a priority of access category, a ProSe Per Packet Priority (PPPP), QoS Class Identifier (QCI), a QoS level, and a QoS flow ID. The priority may be associated with a particular logical channel. In addition, the priority information may include a scaling factor. For example, the scaling factor may be a value in the range of 0.1 and 0.9.

The UE may construct a MAC PDU consisting of RLC PDU(s) from one or more logical channels.

The UE may initiate or trigger a random access procedure for transmission of a MAC PDU consisting of RLC PDUs from one or more logical channels. In this case, if a value of a highest priority of the logical channel is higher than or equal to the threshold value of the priority, the UE may not apply random access backoff while performing the random access procedure, or the UE may set the backoff parameter value to 0 ms while performing the random access procedure. Or, in this case, if the value of the highest priority of the logical channel is listed in the priority information, the UE may not apply the random access backoff while performing the random access procedure, or the UE may set the backoff parameter value to 0 ms while performing the random access procedure. Or, in this case, if the access category associated with the logical channel is listed in the priority information, the UE may not apply the random access backoff while performing the random access procedure, or the UE may set the backoff parameter value to 0ms while performing the random access procedure. Alternatively, the UE may set the backoff parameter value to 'the value of the received backoff parameter multiplied by the scaling factor' while performing the random access procedure.

The UE may initiate or trigger a random access procedure for transmission of a MAC PDU consisting of RLC PDUs from one or more logical channels, and may receive a backoff parameter. In this case, if the value of the highest priority of the logical channel is lower than the threshold value of the priority, the UE may apply random access backoff while performing the random access procedure or the UE may set the value of the received backoff parameter to the backoff parameter value during the random access procedure. Or, in this case, if the value of the highest priority of the logical channel is not listed in the priority information, the UE may apply random access backoff while performing the random access procedure, or the UE may set the value of the received backoff parameter to the backoff parameter value during the random access procedure. Or, in this case, if the access category associated with the logical channel is not listed in the priority information, the UE may apply the random access backoff while performing the random access procedure, or the UE may set the value of the received backoff parameter to the backoff parameter value during the random access procedure.

Figure 8:
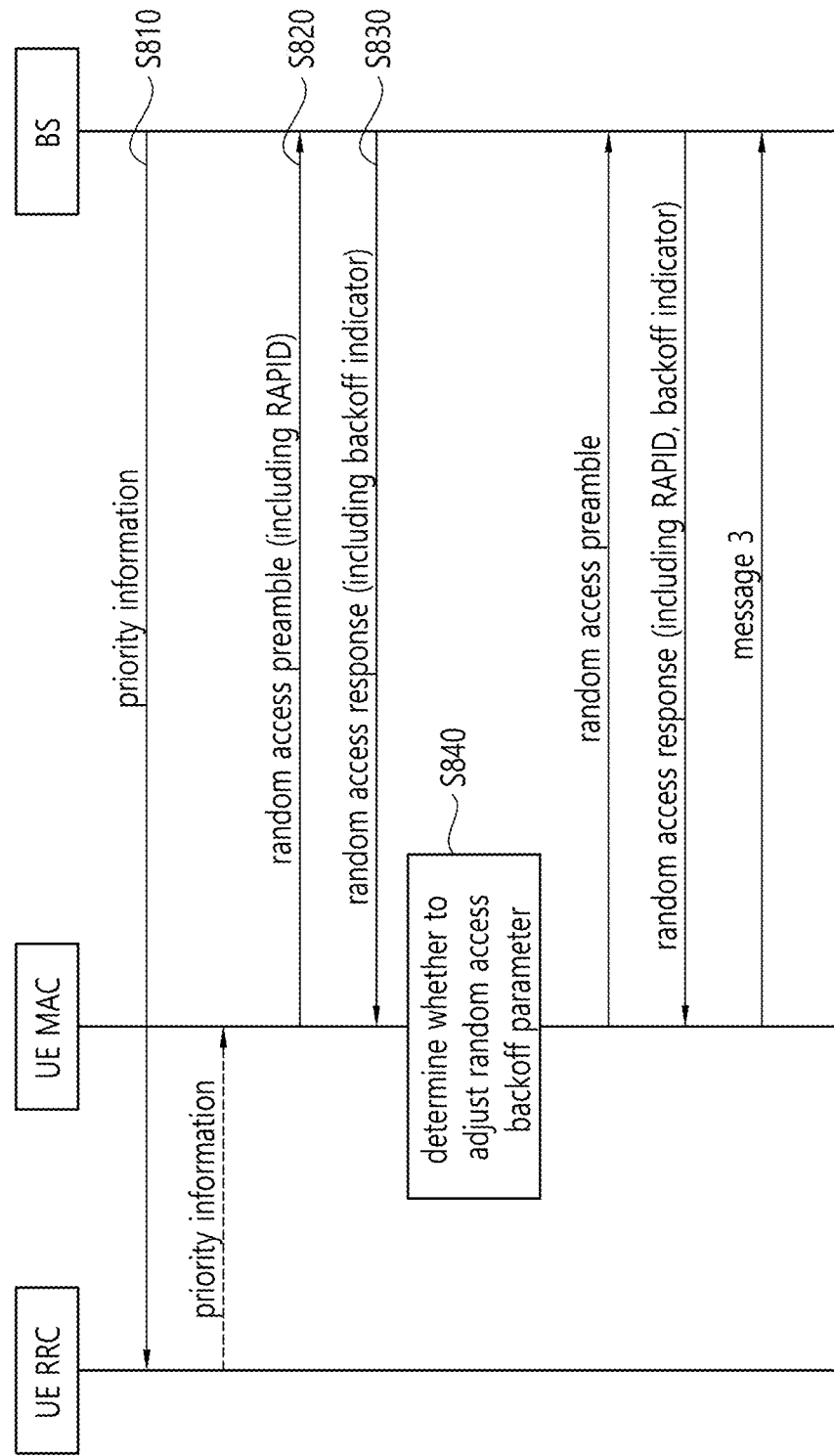
FIG. 8 shows a procedure of adjusting a random access parameter according to an embodiment of the present invention.

FIG. 8 shows a procedure of adjusting a random access parameter according to an embodiment of the present invention.

Referring to FIG. 8, in step S810, a UE may receive priority information from a BS. The priority information may be information for adjusting a random access backoff parameter. The priority information may be received via a random access response message. Although not shown in FIG. 8, in this case, the priority information may be received by a MAC layer of the UE. Alternatively, the priority information may be received via an RRC message such as system information. In this case, the priority information may be received by an RRC layer of the UE. The RRC layer of the UE may be provided to the MAC layer of the UE.

The priority information may include at least any one of a threshold value of a priority, a list of priorities, and a list of access categories. The priority may correspond to at least any one of a logical channel priority, a priority of access category, a ProSe Per Packet Priority (PPPP), QoS Class Identifier (QCI), a QoS level, and a QoS flow ID. The priority may be associated with a particular logical channel. In addition, the priority information may include a scaling factor. For example, the scaling factor may be a value in the range of 0.1 and 0.9.

In step S820, the UE may initiate or trigger a random access procedure. The random access procedure may be initiated or triggered for transmission of a MAC PDU consisting of RLC PDUs from one or more logical channels. The UE may transmit a random access preamble to the BS.

In step S830, the UE may receive a random access response including a BI from the BS.

In step S840, the UE may determine whether to adjust a random access backoff parameter value indicated by the BI. The adjusting of the backoff parameter value to 0 ms may mean that the random access backoff is to be skipped.

In the random access procedure, if a value of a highest priority of the logical channel is higher than or equal to the threshold value of the priority, the UE may not apply random access backoff while performing the random access procedure, or the UE may set the backoff parameter value to 0 ms while performing the random access procedure. Otherwise, the UE may apply the random access backoff while performing the random access procedure, or the UE may set the value of the received backoff parameter to the backoff parameter value during the random access procedure.

In the random access procedure, if the value of the highest priority of the logical channel is listed in the priority information, the UE may not apply random access backoff while performing the random access procedure, or the UE may set the backoff parameter value to 0 ms while performing the random access procedure. Otherwise, the UE may apply the random access backoff while performing the random access procedure, or the UE may set the value of the received backoff parameter to the backoff parameter value during the random access procedure.

In the random access procedure, if the access category associated with the logical channel is listed in the priority information, the UE may not apply the random access backoff while performing the random access procedure, or the UE may set the backoff parameter value to 0ms while performing the random access procedure. Otherwise, the UE may apply the random access backoff while performing the random access procedure, or the UE may set the value of the received backoff parameter to the backoff parameter value during the random access procedure.

If the random access procedure is performed for a certain purpose (e.g., handover), the UE may not apply the random access backoff while performing the random access procedure, or the UE may set the backoff parameter value to 0 ms while performing the random access procedure. Otherwise, the UE may apply the random access backoff while performing the random access procedure, or the UE may set the value of the received backoff parameter to the backoff parameter value during the random access procedure.

According to an embodiment of the present invention, a procedure in which the UE adjusts the random access backoff parameter value may be proposed as shown in Table 2.

TABLE 2

In details, if the random access procedure is triggered for transmission of MAC PDU consisting of RLC PDUs from one or more logical channels e.g. due to scheduling request for transmission of the MAC PDU or due to any MAC procedure e.g. Buffer Statue Reporting for transmission of the MAC PDU, the UE shall:
1> if a downlink assignment for this TTI has been received on the PDCCH for the RA-RNTI and the received TB is successfully decoded, the MAC entity shall regardless of the possible occurrence of a measurement gap or a Sidelink Discovery Gap for Transmission or a Sidelink Discovery Gap for Reception:
2> if the Random Access Response contains a Backoff Indicator subheader and if the value of the highest priority of the logical channel is lower than the threshold or not listed in thepriority information, or if the access category associated with the logical channel is not listed inthe priority information:
3> set the backoff parameter value to the value of the BI field of the Backoff Indicator subheader
2> else if the scaling factor is not received from gNB
3> set the backoff parameter value to 0 ms;
2> else if the scaling factor is received from gNB
3> set the backoff parameter value to 'the value of the BI field of the Backoff Indicator subheader multiplied by the scaling factor.
1> if no Random Access Response is received within the RA Response window, or if none of all received Random Access Responses contains a Random Access Preamble identifier (RAPID) corresponding to the transmitted Random Access Preamble, the Random Access Response reception is considered not successful and the MAC entity shall:
2> based on the backoff parameter, select a random backoff time according to a uniform distribution between 0 and the Backoff Parameter Value;
2> delay the subsequent Random Access transmission by the backoff time (Alternatively, if the value of the highest priority of the logical channel is higher than or equal to the thresholdor listed in the priority information, or if the access category associated with the logical channelis listed in the priority information, the UE shall skip the backoff so that UE shall not delaythe subsequent Random Access transmission, instead of delaying the subsequent Random Access transmission);
1> if the Contention Resolution is considered not successful the MAC entity shall:
2> flush the HARQ buffer used for transmission of the MAC PDU in the Msg3 buffer;
2> if the notification of power ramping suspension has not been received from lower layers:
3> increment PREAMBLE_TRANSMISSION_COUNTER by 1;

TABLE 2-continued

2> if the UE is an NB-IoT UE, a BL UE or a UE in enhanced coverage:
3> if PREAMBLE_TRANSMISSION_COUNTER = preambleTransMax-CE + 1:
4> indicate a Random Access problem to upper layers.
4> if NB-IoT:
5> consider the Random Access procedure unsuccessfully completed;
2> else:
3> if PREAMBLE_TRANSMISSION_COUNTER = preambleTransMax + 1:
4> indicate a Random Access problem to upper layers.
2> based on the backoff parameter, select a random backoff time according to a uniform distribution between 0 and the Backoff Parameter Value;
2> delay the subsequent Random Access transmission by the backoff time (Alternatively, if the value of the highest priority of the logical channel is higher than or equal to the thresholdor listed in the priority information, or if the access category associated with the logical channelis listed in the priority information, the UE shall skip the backoff so that UE shall not delaythe subsequent Random Access transmission, instead of delaying the subsequent Random Access transmission);
2> proceed to the selection of a Random Access Resource.

Thereafter, the UE may transmit a random access preamble to the BS based on the adjusted random access backoff parameter value, and may receive the random access response from the BS. In the random access procedure, if the random access response includes a random access preamble identifier (RAPID) corresponding to the transmitted random access preamble, the UE may transmit a message 3 to the BS according to the procedure of Table 3.

the UE may set the backoff parameter value to 0 ms while performing the random access procedure. The procedure for access to the cell may be an RRC procedure. For example, the RRC procedure may be an RRC Connection Establishment procedure, an RRC Connection Reestablishment procedure, an RRC Connection Resume procedure or an RRC Connection Activation procedure.

TABLE 3

1> if the Random Access Response contains a Random Access Preamble identifier corresponding to the transmitted Random Access Preamble, the MAC entity shall:
2> consider this Random Access Response reception successful and apply the following actions for the serving cell where the Random Access Preamble was transmitted:
3> process the received Timing Advance Command;
3> indicate the preambleInitialReceivedTargetPower and the amount of power ramping applied to the latest preamble transmission to lower layers (i.e.,
(PREAMBLE_TRANSMISSION_COUNTER − 1) * powerRampingStep);
3> process the received UL grant value and indicate it to the lower layers;
2> if ra-PreambleIndex was explicitly signalled and it was not 000000 (i.e., not selected by MAC):
3> consider the Random Access procedure successfully completed.
2> else, if the Random Access Preamble was selected by the MAC entity:
3> set the Temporary C-RNTI to the value received in the Random Access Response message no later than at the time of the first transmission corresponding to the UL grant provided in the Random Access Response message;
3> if this is the first successfully received Random Access Response within this Random Access procedure:
4> if the transmission is not being made for the CCCH logical channel, indicate to the Multiplexing and assembly entity to include a C-RNTI MAC control element in the subsequent uplink transmission;
4> obtain the MAC PDU to transmit from the "Multiplexing and assembly" entity and store it in the Msg3 buffer.

According to an embodiment of the present invention, the random access backoff is applicable only for random access attempts with lower priorities or certain purposes, depending on a network configuration. That is, the UE may skip the random access backoff while performing random access with a higher priority (e.g. SRB) or a certain purpose (e.g. handover), or may adjust the random access backoff parameter to a small value. Accordingly, a prioritized access or handover or the like can be prevented from being delayed.

Figure 9:
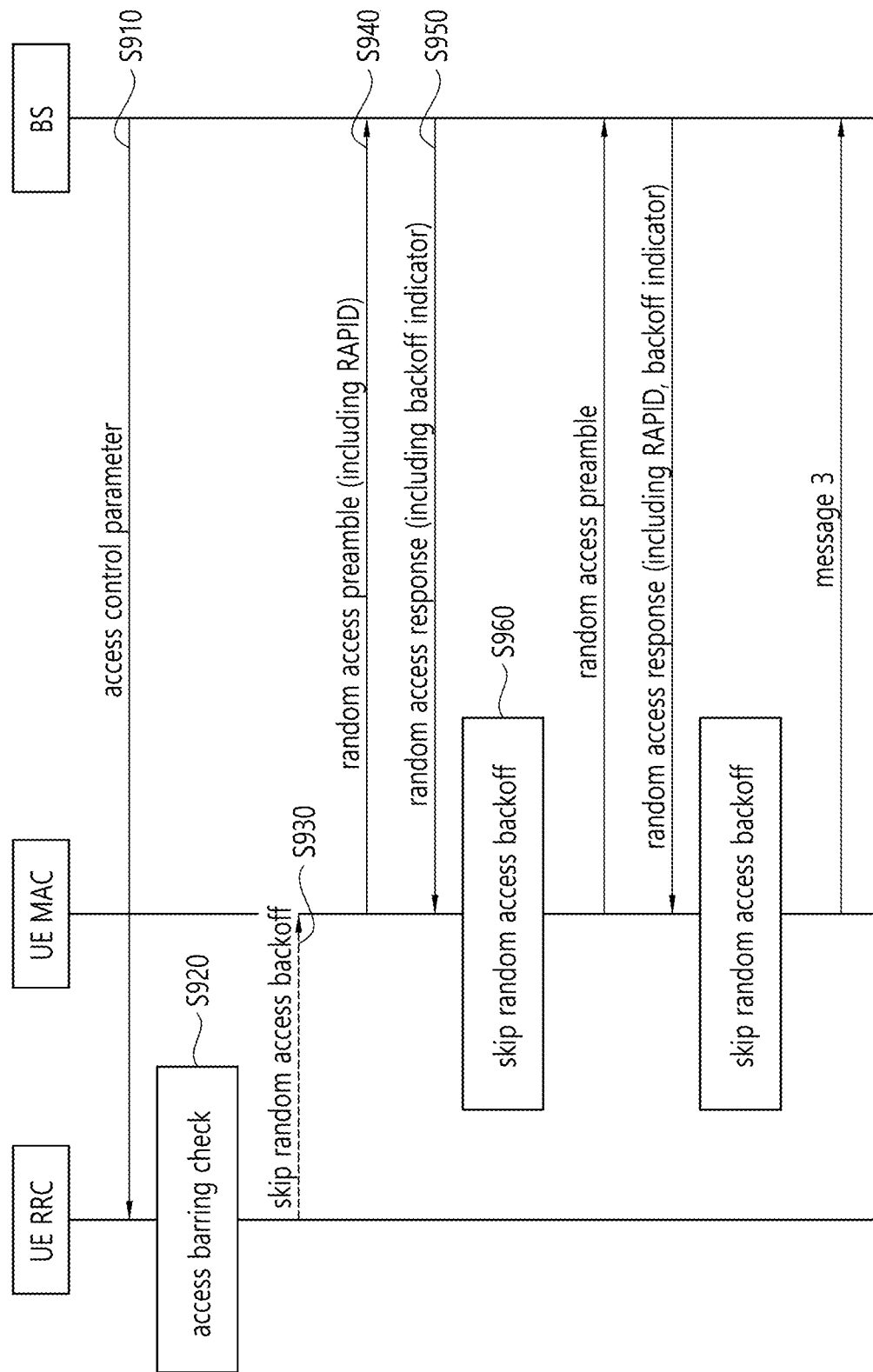
FIG. 9 shows a procedure of skipping a random access backoff according to an embodiment of the present invention.

FIG. 9 shows a procedure of skipping a random access backoff according to an embodiment of the present invention.

According to an embodiment of the present invention, when a UE initiates a procedure for access to a cell, if the UE passes an access barring check of an upper layer and the UE initiates the random access procedure as a result of the access barring check, the UE may not apply random access backoff while performing the random access procedure, or Referring to FIG. 9, in step S910, the UE may receive access barring information from a cell. The access barring information may be an access control parameter. For example, the access barring information may be ac-BarringInfo. The access barring information may be received via system information. The system information may be SIB2. In addition, the UE may initiate an RRC procedure for access to the cell. The RRC procedure may be an RRC Connection Establishment procedure, an RRC Connection Re-establishment procedure, an RRC Connection Resume procedure, or an RRC Connection Activation procedure.

In step S920, in the RRC procedure, the UE may check whether access to the cell is barred based on the received access barring information. Whether access to the cell is barred may be checked according to the procedure of Table 4.

TABLE 4

The UE shall:
1> if SystemInformationBlockType2 includes "AC barring parameter":
2> if the UE has one or more Access Classes, as stored on the USIM, with a value in the range 11..15, which is valid for the UE to use, and
NOTE: ACs 12, 13, 14 are only valid for use in the home country and ACs 11, 15 are only valid for use in the HPLMN/ EHPLMN.
2> for at least one of these valid Access Classes the corresponding bit in the ac-BarringForSpecialAC contained in "AC barring parameter" is set to zero:
3> consider access to the cell as not barred;
2> else:
3> draw a random number 'rand' uniformly distributed in the range: 0 ≤ rand < 1;
3> if 'rand' is lower than the value indicated by ac-BarringFactor included in "AC barring parameter":
4> consider access to the cell as not barred;
3> else:
4> consider access to the cell as barred;
1> else:
2> consider access to the cell as not barred;
1> if access to the cell is barred and both timers T302 and "Tbarring" are not running:
2> draw a random number 'rand' that is uniformly distributed in the range 0 ≤ rand < 1;
2> start timer "Tbarring" with the timer value calculated as follows, using the ac-BarringTime included in "AC barring parameter": "Tbarring" = (0.7+ 0.6 * rand) * ac-BarringTime;

If the UE considers access to the cell as not barred as the result of the access barring check of Table 4 described above, the UE may initiate the RRC Connection Establishment, Re-establishment, Resume, or Activation. In addition, the UE RRC may instruct the UE MAC to initiate the random access procedure. That is, if the UE considers access to the cell as not barred, the RRC layer of the UE may instruct the MAC layer of the UE to initiate the random access procedure.

In addition, in step S930, the UE RRC may instruct the UE MAC to skip the random access backoff in the random access procedure. The step S930 may be omitted. Namely, if the UE considers access to the cell as not barred, the RRC layer of the UE may instruct the MAC layer of the UE to skip the random access backoff in the random access procedure.

In step S940, the UE may transmit a random access preamble to a BS. In step S950, the UE may receive a random access response including a BI from the BS.

In step S960, the UE may skip the random access backoff in the random access procedure. Specifically, in the random access procedure, if the UE considers access to the cell as not barred as the result of the access barring check, the MAC layer of the UE may determine not to delay a subsequent random access transmission by the backoff time. Alternatively, in the random access procedure, if the RRC layer of the UE instructs the MAC layer of the UE to skip the random access backoff, the MAC layer of the UE may determine not to delay a subsequent random access transmission by the backoff time.

According to an embodiment of the present invention, a procedure in which the UE skips random access backoff may be proposed as shown in Table 5.

TABLE 5

In details, during the random access procedure, the UE shall:
1> if a downlink assignment for this TTI has been received on the PDCCH for the RA-RNTI and the received TB is successfully decoded, the MAC entity shall regardless of the possible occurrence of a measurement gap or a Sidelink Discovery Gap for Transmission or a Sidelink Discovery Gap for Reception:
2> if the Random Access Response contains a Backoff Indicator subheader and if the RRC layer does not indicate that the random access backoff is skipped (i.e. due to the result of theaccess barring check):
3> set the backoff parameter value as indicated by the BI field of the Backoff Indicator subheader.
2> else, set the backoff parameter value to 0 ms.
1> if no Random Access Response is received within the RA Response window, or if noneof all received Random Access Responses contains a Random Access Preamble identifier (RAPID) corresponding to the transmitted Random Access Preamble, the Random Access Response reception is considered not successful and the MAC entity shall:
2> based on the backoff parameter, select a random backoff time according to a uniform distribution between 0 and the Backoff Parameter Value;
2> delay the subsequent Random Access transmission by the backoff time (Alternatively, if the RRC layer does not indicate that the random access backoff is skipped (i.e. due to the resultof the access barring check), the UE shall skip the backoff so that UE shall not delay the subsequent Random Access transmission, instead of delaying the subsequent Random Access transmission);
1> if the Contention Resolution is considered not successful the MAC entity shall:
2> flush the HARQ buffer used for transmission of the MAC PDU in the Msg3 buffer;
2> if the notification of power ramping suspension has not been received from lower layers:
3> increment PREAMBLE_TRANSMISSION_COUNTER by 1;
2> if the UE is an NB-IoT UE, a BL UE or a UE in enhanced coverage:
3> if PREAMBLE_TRANSMISSION_COUNTER = preambleTransMax-CE + 1:
4> indicate a Random Access problem to upper layers.
4> if NB-IoT:
5> consider the Random Access procedure unsuccessfully completed;

TABLE 5-continued

2> else:
3> if PREAMBLE_TRANSMISSION_COUNTER = preambleTransMax + 1:
4> indicate a Random Access problem to upper layers.
2> based on the backoff parameter, select a random backoff time according to a uniform
distribution between 0 and the Backoff Parameter Value;
2> delay the subsequent Random Access transmission by the backoff time (Alternatively, if the
RRC layer does not indicate that the random access backoff is skipped (i.e. due to the resultof
the access barring check), the UE shall skip the backoff so that UE shall not delay the subsequent
Random Access transmission, instead of delaying the subsequent Random Access
transmission);
2> proceed to the selection of a Random Access Resource.

Thereafter, the UE may transmit a random access preamble to the BS based on the adjusted random access backoff parameter value, and may receive the random access response from the BS. In the random access procedure, if the random access response includes a random access preamble identifier (RAPID) corresponding to the transmitted random access preamble, the UE may transmit a message 3 to the BS according to the procedure of Table 3.

According to an embodiment of the present invention, a connection request which has passed the access barring check can be prevented from being delayed due to the random access backoff.

Figure 10:
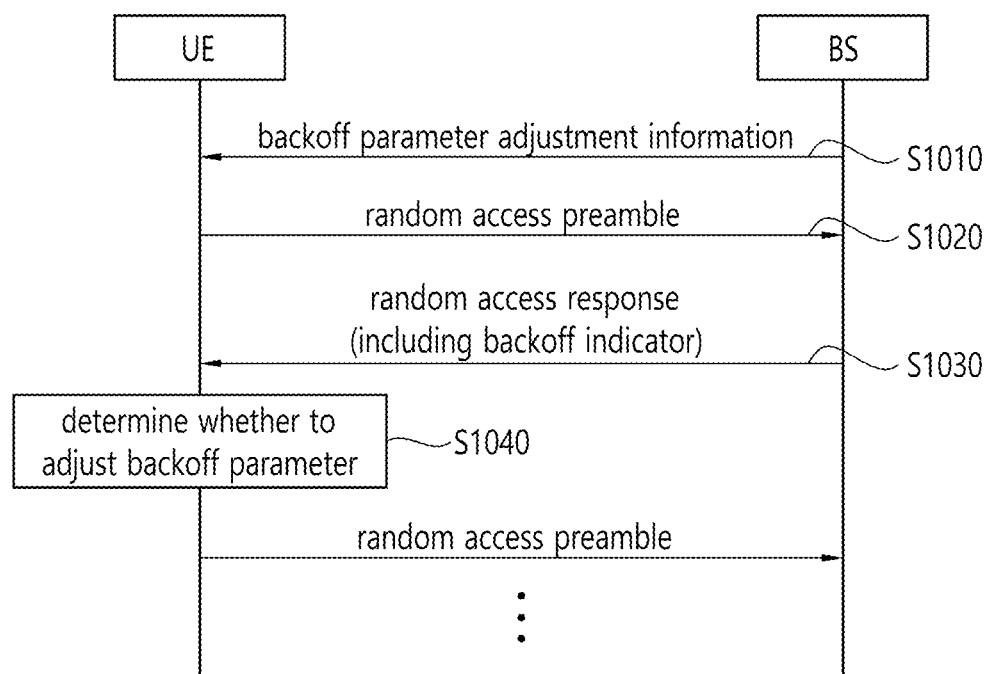
FIG. 10 shows a procedure of adjusting a random access backoff parameter according to an embodiment of the present invention.

FIG. 10 shows a procedure of adjusting a random access backoff parameter according to an embodiment of the present invention.

Referring to FIG. 10, in step S1010, a UE may receive backoff parameter adjustment information from a BS. The backoff parameter adjustment information may be information for adjusting a random access backoff parameter. The backoff parameter adjustment information may be received by an RRC layer of the UE, and thereafter may be transferred to a MAC layer of the UE from the RRC layer of the UE. Alternatively, the backoff parameter adjustment information may be received by the MAC layer of the UE.

The backoff parameter adjustment information may include at least any one of a threshold value of a priority, a list of priorities, a list of access categories, and access barring information. The priority may correspond to at least any one of a logical channel priority, a priority of access category, a ProSe Per Packet Priority (PPPP), QoS Class Identifier (QCI), a QoS level, and a QoS flow ID. The priority may be associated with a particular logical channel. The access barring information may be an access control parameter. In addition, the backoff parameter adjustment information may include a scaling factor. For example, the scaling factor may be a value in the range of 0.1 and 0.9.

In step S1020, the UE may initiate or trigger a random access procedure. The random access procedure may be initiated or triggered for transmission of a MAC PDU consisting of RLC PDUs from one or more logical channels. The UE may transmit a random access preamble to the BS.

In step S1030, the UE may receive a random access response including a BI from the BS.

In step S1040, the UE may determine whether to adjust a random access backoff parameter value indicated by the BI. The adjusting of the backoff parameter value to 0 ms may mean that the random access backoff is to be skipped.

In the random access procedure, if a value of a highest priority of the logical channel is higher than or equal to the threshold value of the priority, the UE may not apply random access backoff while performing the random access procedure, or the UE may set the backoff parameter value to 0 ms while performing the random access procedure. Otherwise, the UE may apply the random access backoff while performing the random access procedure, or the UE may set the value of the received backoff parameter to the backoff parameter value during the random access procedure.

In the random access procedure, if the value of the highest priority of the logical channel is listed in the priority information, the UE may not apply random access backoff while performing the random access procedure, or the UE may set the backoff parameter value to 0 ms while performing the random access procedure. Otherwise, the UE may apply the random access backoff while performing the random access procedure, or the UE may set the value of the received backoff parameter to the backoff parameter value during the random access procedure.

In the random access procedure, if the access category associated with the logical channel is listed in the priority information, the UE may not apply the random access backoff while performing the random access procedure, or the UE may set the backoff parameter value to 0ms while performing the random access procedure. Otherwise, the UE may apply the random access backoff while performing the random access procedure, or the UE may set the value of the received backoff parameter to the backoff parameter value during the random access procedure.

If the RRC layer of the UE determines that the random access procedure is performed for the purpose of handover, the RRC layer of the UE may instruct the MAC layer of the UE to skip backoff. For example, the RRC layer of the UE may instruct a backoff skip indicator to the MAC layer of the UE. In this case, the UE may not apply random access backoff while performing the random access procedure, or the UE may set the backoff parameter value to 0 ms while performing the random access procedure. Otherwise, the UE may apply the random access backoff while performing the random access procedure, or the UE may set the value of the received backoff parameter to the backoff parameter value during the random access procedure.

If the RRC layer of the UE considers access to the cell as not barred, the RRC layer of the UE may instruct the MAC layer of the UE to skip the backoff. For example, the RRC layer of the UE may instruct the backoff skip indicator to the MAC layer of the UE. In this case, the UE may not apply random access backoff while performing the random access procedure, or the UE may set the backoff parameter value to 0 ms while performing the random access procedure. Otherwise, the UE may apply the random access backoff while performing the random access procedure, or the UE may set the value of the received backoff parameter to the backoff parameter value during the random access procedure.

Thereafter, the UE may retransmit the random access preamble based on the adjusted backoff parameter value.

According to an embodiment of the present invention, the random access backoff is applicable only for random access attempts with lower priorities or certain purposes, depending on a network configuration. Accordingly, a prioritized access or handover or the like can be prevented from being delayed. Further, a connection request which has passed the access barring check can be prevented from being delayed due to the random access backoff.

Figure 11:
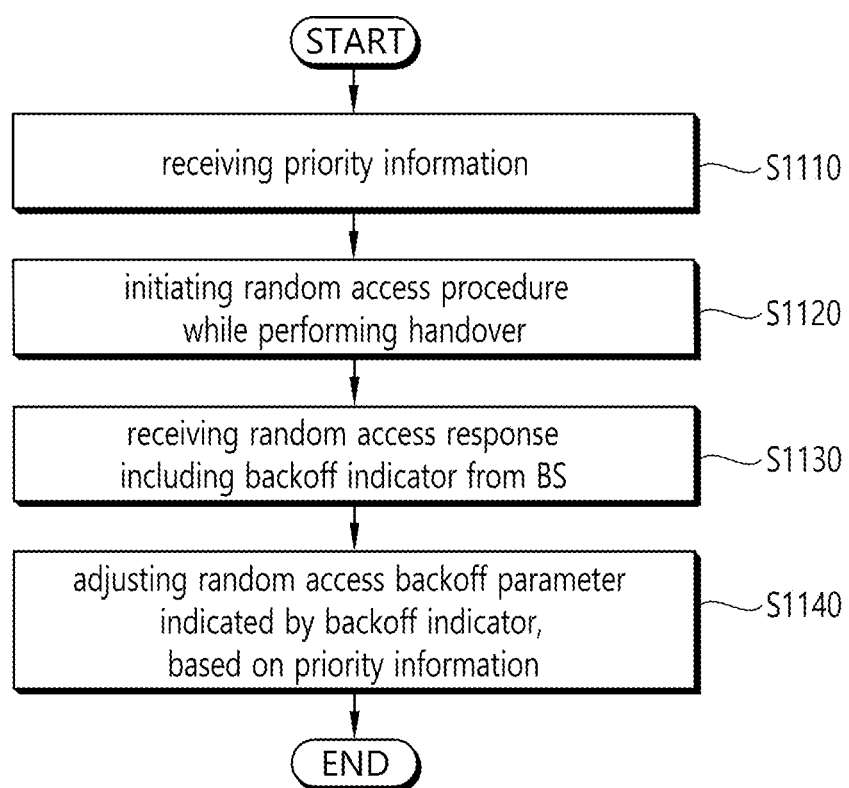
FIG. 11 is a block diagram showing a method in which a UE adjusts a random access backoff parameter according to an embodiment of the present invention.

FIG. 11 is a block diagram showing a method in which a UE adjusts a random access backoff parameter according to an embodiment of the present invention.

Referring to FIG. 11, in step S1110, the UE may receive priority information. The priority information may include a priority threshold value. The priority information may include a priority list. The priority information may include an access category list. The priority information may include a priority list and a scaling factor. The priority information may include an access control parameter.

The priority may correspond to at least any one of a logical channel priority, a priority of access category, a ProSe Per Packet Priority (PPPP), QoS Class Identifier (QCI), a QoS level, and a QoS flow ID.

In step S1120, the UE may initiate a random access procedure while performing a handover. The random access procedure may be initiated to transmit a medium access control (MAC) protocol data unit (PDU) including a radio link control (RLC) PDU from one or more logical channels.

In step S1130, the UE may receive a random access response including a backoff indicator from a BS.

In step S1140, the UE may adjust a random access backoff parameter indicated by the backoff indicator based on the priority information. The random access backoff parameter may be adjusted to 0.

If a value of a highest priority of a logical channel is higher than or equal to the priority threshold value, the random access backoff parameter may be adjusted to 0.

If the highest priority value of the logical channel is included in the priority list, the random access backoff parameter may be adjusted to 0.

If an access category associated with a logical channel is included in the access category list, the random access backoff parameter may be adjusted to 0.

If a value of a highest priority of a logical channel is included in the priority list, the random access backoff parameter may be adjusted by multiplying the scaling factor.

If the UE determines access to a cell as not barred based on the access control parameter, the random access backoff parameter may be adjusted to 0.

A subsequent random access transmission may be delayed in the random access procedure based on the adjusted random access backoff parameter. A random access preamble transmitted by the UE after receiving the random access response may be transmitted in the subsequent random access transmission. For example, a random access preamble retransmitted in the random access procedure may be transmitted in the subsequent random access transmission.

In addition, the UE may transmit a subsequent random access preamble to the BS based on the adjusted random access backoff parameter.

Figure 12:
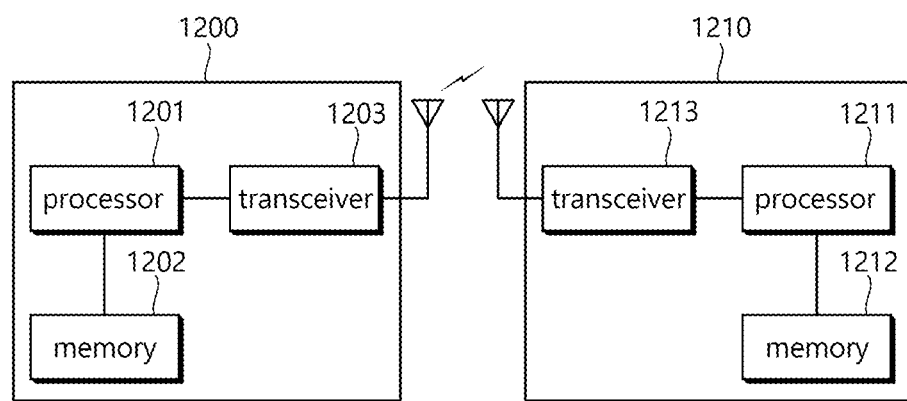
FIG. 12 is a block diagram illustrating a wireless communication system according to the embodiment of the present invention.

FIG. 12 is a block diagram illustrating a wireless communication system according to the embodiment of the present invention.

A BS 1200 includes a processor 1201, a memory 1202 and a transceiver 1203. The memory 1202 is connected to the processor 1201, and stores various information for driving the processor 1201. The transceiver 1203 is connected to the processor 1201, and transmits and/or receives radio signals. The processor 1201 implements proposed functions, processes and/or methods. In the above embodiment, an operation of the base station may be implemented by the processor 1201.

A UE 1210 includes a processor 1211, a memory 1212 and a transceiver 1213. The memory 1212 is connected to the processor 1211, and stores various information for driving the processor 1211. The transceiver 1213 is connected to the processor 1211, and transmits and/or receives radio signals. The processor 1211 implements proposed functions, processes and/or methods. In the above embodiment, an operation of the UE may be implemented by the processor 1211.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings based on the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:
1. A method performed by a user equipment (UE) in a wireless communication system, the method comprising:
  receiving, from a base station, a scaling factor for prioritized random access;
  initiating a random access procedure;
  receiving, from the base station, a random access response comprising a backoff indicator;
  determining whether the random access procedure was initiated for a handover;
  based on a determination that the random access procedure was initiated for the handover, applying the scaling factor to the backoff indicator to set a random access backoff time; and
  transmitting, after the random access backoff time, a random access preamble to the base station.

2. The method of claim 1, wherein applying the scaling factor to the backoff indicator to set the random access backoff time comprises:
    based on the determination that the random access procedure was initiated for the handover, determining the random access backoff time based on a product of the backoff indicator and the scaling factor.

3. The method of claim 1, wherein applying the scaling factor to the backoff indicator to set the random access backoff time comprises:
    based on the determination that the random access procedure was initiated for the handover, adjusting the random access backoff time by the scaling factor, wherein the random access backoff time is related to the backoff indicator.

4. The method of claim 1, wherein the scaling factor has a value less than one.

5. The method of claim 4, wherein the scaling factor has a value of zero.

6. The method of claim 1, wherein applying the scaling factor to the backoff indicator to set the random access backoff time comprises:
    based on the determination that the random access procedure was initiated for the handover, adjusting the random access backoff time to a value of zero based on the backoff indicator and the scaling factor.

7. The method of claim 1, wherein the random access backoff time is related to a second backoff value that is equal to a first backoff value multiplied by the scaling factor, and wherein the first backoff value corresponds to the backoff indicator.

8. The method of claim 7, wherein the random access backoff time is equal to a uniformly distributed value between 0 and the second backoff value.

9. The method of claim 1, wherein initiating the random access procedure comprises:
    initiating the random access procedure for the handover from a first base station to a second base station with which the UE communicates.

10. A user equipment (UE) configured to operate in a wireless communication system, the UE comprising:
    at least one radio frequency (RF) module;
    at least one processor; and
    at least one computer memory operably connectable to the at least one processor and storing instructions that, when executed, cause the at least one processor to perform operations comprising:
        receiving, through the RF module and from a base station, a scaling factor for prioritized random access;
        initiating a random access procedure;
        receiving, through the RF module and from the base station, a random access response comprising a backoff indicator;
        determining whether the random access procedure was initiated for a handover;
        based on a determination that the random access procedure was initiated for the handover, applying the scaling factor to the backoff indicator to set a random access backoff time; and
        transmitting, through the RF module and after the random access backoff time, a random access preamble to the base station.

11. The UE of claim 10, wherein applying the scaling factor to the backoff indicator to set the random access backoff time comprises:
    based on the determination that the random access procedure was initiated for the handover, determining the random access backoff time based on a product of the backoff indicator and the scaling factor.

12. The UE of claim 10, wherein applying the scaling factor to the backoff indicator to set the random access backoff time comprises:
    based on the determination that the random access procedure was initiated for the handover, adjusting the random access backoff time by the scaling factor, wherein the random access backoff time is related to the backoff indicator.

13. The UE of claim 10, wherein the scaling factor has a value less than one.

14. The UE of claim 13, wherein the scaling factor has a value of zero.

15. The UE of claim 10, wherein applying the scaling factor to the backoff indicator to set the random access backoff time comprises:
    based on the determination that the random access procedure was initiated for the handover, adjusting the random access backoff time to a value of zero based on the backoff indicator and the scaling factor.

16. The UE of claim 10, wherein the random access backoff time is related to a second backoff value that is equal to a first backoff value multiplied by the scaling factor, and wherein the first backoff value corresponds to the backoff indicator.

17. The UE of claim 16, wherein the random access backoff time is equal to a uniformly distributed value between 0 and the second backoff value.

18. The UE of claim 10, wherein initiating the random access procedure comprises:
    initiating the random access procedure for the handover from a first base station to a second base station with which the UE communicates.

* * * * *